May 11, 1965 C. A. LAUER 3,183,369

REVERSIBLE COUNTER OPERATIVE TO COUNT EITHER BINARY OR BINARY CODED DECIMAL NUMBER SYSTEM

Filed Aug. 16, 1961 3 Sheets-Sheet 1

INVENTOR
Charles A. Lauer
BY R. J. Brodahl
ATTORNEY

May 11, 1965 C. A. LAUER 3,183,369

REVERSIBLE COUNTER OPERATIVE TO COUNT EITHER BINARY OR BINARY CODED DECIMAL NUMBER SYSTEM

Filed Aug. 16, 1961 3 Sheets-Sheet 3

United States Patent Office 3,183,369
Patented May 11, 1965

3,183,369
REVERSIBLE COUNTER OPERATIVE TO COUNT EITHER BINARY OR BINARY CODED DECIMAL NUMBER SYSTEM

Charles A. Lauer, Eggertsville, N.Y., assignor to Westinghouse Electric Corporation, East Pittsburgh, Pa., a corporation of Pennsylvania Filed Aug. 16, 1961, Ser. No. 131,864
4 Claims. (Cl. 307—88.5)

The present invention relates in general to pulse counting apparatus, and more particularly to reversible pulse counting apparatus operative to count applied input pulses in either one of a forward and a reverse direction as may be desired, and in either one of a binary and a binary coded decimal number system.

Pulse counting is accomplished electronically by utilizing electrical pulses which are applied to the input of the pulse counter. Some particular event, such as the distance moved by a machine tool member, can be used to generate input pulses which are then counted by using bistable circuits that change operative states as a function of the number of input pulses applied to the input of the pulse counter.

A particular bistable circuit including two NOR circuits has been developed for use with NOR circuitry in pulse counting apparatus such as in accordance with the present invention. This bistable circuit includes two switching transistor devices and has two stable states of operation, one of such states is with a first of the transistors saturated and the second transistor cutoff, and the second state is with the first transistor cutoff and the second transistor saturated. To cause this bistable circuit to change its operative state, a negative one pulse is applied to its input whereby the bistable circuit will change operative states when this one input pulse is applied to its input.

Particularly adaptable to electronic counting is the binary number system. The binary number system employs digits having two values, ZERO and ONE. It may be readily seen that these two values may be represented by the two operative states of the previously mentioned bistable circuit.

It is an object of the present invention to provide improved pulse counting apparatus that is more reliable and accurate in operation relative to the binary coded decimal number system for performing both forward and reverse counting operations.

It is another object of the present invention to provide improved pulse counter apparatus that is more flexible with regard to the actual applications that can be made of the counter apparatus.

It is a different object of the present invention to provide improved pulse counting apparatus that is more simple in construction and number of required circuit elements and is easier to control regarding desired changes in its counting operation.

Broadly, the present invention provides reversible pulse counting apparatus in which, a plurality of counting stages, with gating circuits connected therebetween, are operative to count incoming pulses in either a binary or a binary coded decimal number system. Biasing control is used to effect the forward or reverse direction of counting of the apparatus; while feedbox control is provided to control the state of the counting stages in accordance with the number system utilized.

These and other objects and advantages of the present invention will become apparent in view of the following description taken in conjunction with the drawings, wherein.

The pulse counting apparatus in accordance with the present invention includes a plurality of bistable circuits, each of which changes operative states when a signal is applied to its respective input. The bistable circuit can have two outputs, namely the output of the first NOR element within the bistable circuit and the output of the second NOR element within that same bistable circuit. In this regard if one of these outputs is a ZERO signal, the other of the outputs will be a ONE signal. The output of the second NOR circuit is arbitrarily chosen to display the count or operative state of that particular bistable circuit.

When a series of input pulses is applied to the input of the first bistable circuit, it will change its operative state with each pulse so applied, and its output will indicate the count value of the first binary digital bit represented by that particular circuit. The first bistable stage 1 represents the first bit or the $2^0$ bit. The second bistable stage 2 represents the second bit or the $2^1$ bit. The third bistable stage 3 represents the third bit or the $2^2$ bit. The number of bistable stages employed in the particular pulse counting apparatus desired will depend upon the required counting capacity for the application to be made of the counter apparatus, as is presently well known to persons skilled in this particular art.

When it is desired that the pulse counter be operative to count in a forward or up (1, 2, 3, etc.) direction, the second stage bistable circuit should change states whenever the first stage circuit changes from a ONE to a ZERO count level. Thusly, the output signal of the second stage circuit then changes from a ZERO to a ONE value to trigger the next or third stage bistable circuit. Thus, when counting up, if the first stage goes from a ONE to a ZERO to cause a change in state of the second stage, then the second stage must go from a ONE to a ZERO to cause change in state of the third stage.

Figure 1:
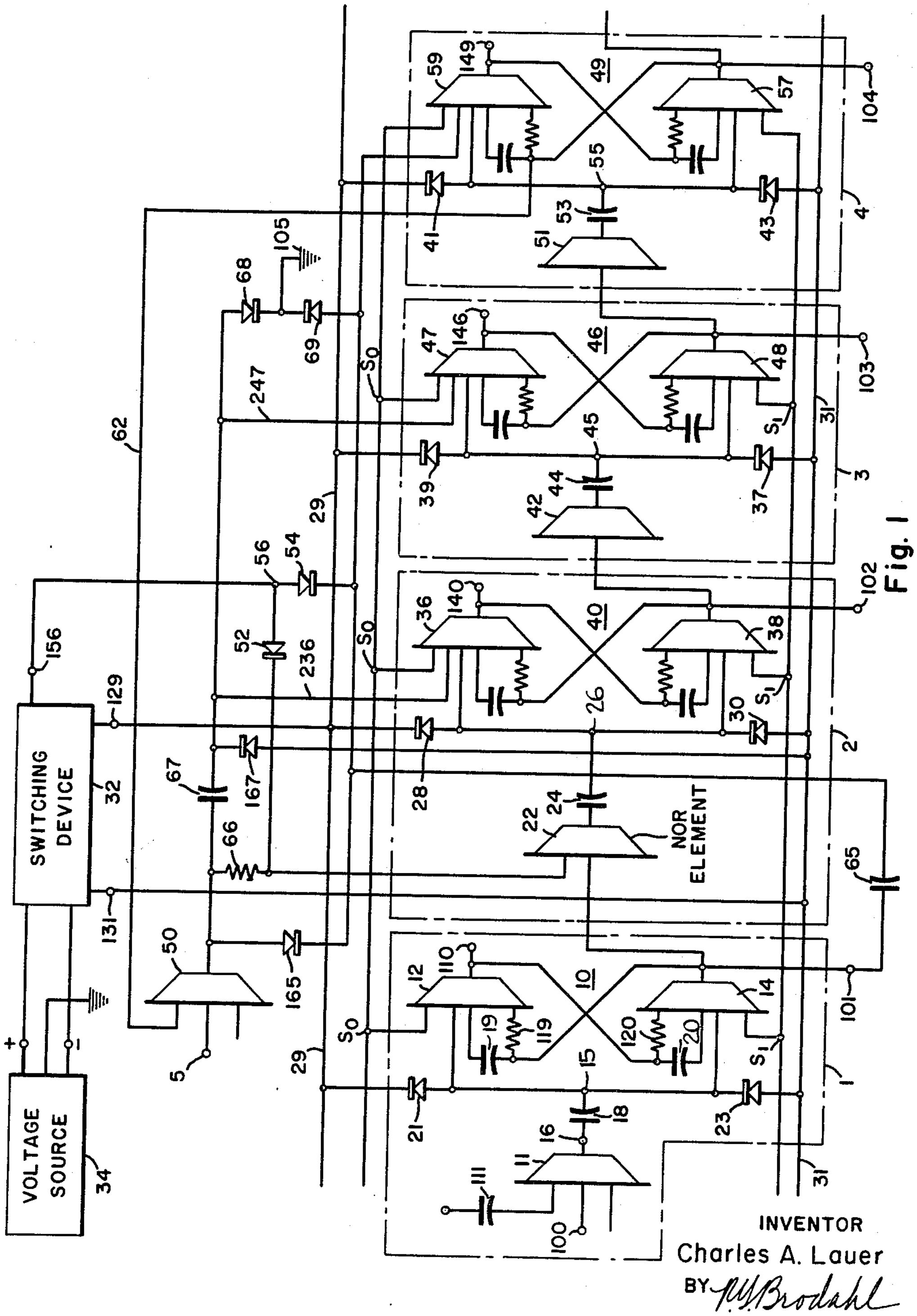
FIGURE 1 is a schematic showing of pulse counting apparatus in accordance with the teachings of the present invention.

In FIG. 1, there is shown the first stage bistable circuit 10 including a NOR element 12 and a second NOR element 14 connected together to form a bistable circuit which per se is very well known to persons presently skilled in this particular art. For example, see Control Engineering, May 1957, page 16, FIG. 14, showing both the basic NOR element and the bistable circuit. Input pulses to be counted are supplied to the input NOR element 11 at the terminal 100, and then through the NOR device 11 to terminal 16 and through a differentiating capacitor 18 to a circuit junction 15 operative with the clipping diodes 21 and 23 for energizing one input of each of the NOR devices 12 and 14. The capacitors 19 and 20 and the resistors 119 and 120 are operative such that the bistable circuit always changes state on the occurrence of an input pulse. The input capacitor 111 is provided as a dynamic couple to the NOR device 11 for other possible counter stages, and to provide an additional input to a series connected counter.

If the initially reset operative condition of the NOR devices 11, 12 and 14 is such that the NOR device 11 is providing a ONE output signal, the NOR device 12 is providing a ZERO output signal, the NOR device 14 is providing a ONE output signal. The count output signals are taken from terminals 110, 140, 146 and 149 for the counting stages 1, 2, 3 and 4, respectively. When the first input pulse is applied to terminal 100, this will cause the NOR device 11 to change its state of operation to provide a ZERO output signal, and the NOR device 12 to change its state of operation such that a ONE output signal is supplied by the NOR device 12 and a ZERO output signal is supplied by the NOR device 14. The second input pulse supplied to the input terminal 100 causes the bistable circuit 10 to again change its state of operation such that the NOR device 12 now supplies a ZERO output signal and the NOR device 14 supplies a ONE output signal.

The output signal supplied by the NOR device 14 is coupled through a signal inversion NOR device 22 and a differentiating capacitor 24 to a circuit junction 26 operative with the clipping diodes 28 and 30.

The output of the NOR device 22 is supplied through the capacitor 24 and the circuit junction 26 to an input of each of the NOR devices 36 and 38 within a second stage bistable circuit 40. The second stage bistable circuit is operative to display the count value of the second bit of the binary number stored by the present pulse counting apparatus. The output signal supplied by the NOR device 38 is coupled through a signal inversion NOR device 42 and a differentiating capacitor 44 to a circuit junction 45, operative with the clipping diodes 37 and 39, and then to the bistable circuit 46 for the third binary bit of the total number to be stored or counted. The output signal supplied by the NOR element 48 is coupled through a signal inversion NOR device 51 and a differentiating capacitor 53 to a circuit junction 55, operative with the clipping diodes 41 and 43, and then to the bistable circuit 49 for the fourth binary bit to be stored or counted. The clipping diodes 21, 23, 28, 30, 37, 39, 41 and 43 are operative with a switching device 32 and a source of bias voltage 34 as will be later explained relative to a description of each of the forward counting operation and the reverse counting operation of the present pulse counter apparatus.

From the output terminal 104 of the NOR device 57, a feedback path is provided to the NOR device 50 through the conductor 62. The output of NOR device 50 is connected through the diode 165 to an input of NOR device 59 and to the capacitor 65, which is connected to the terminal 101 of the NOR element 14. The output of NOR device 50 is also connected through the resistor 66 to an input of the inversion NOR element 22, and to the capacitor 67 which in turn is connected to NOR 36 through conductor 236 and to NOR 47 through conductor 247. A clamping diode 167 is connected to the other side of the capacitor 67 to the conductor 31. Capacitor 67 is also connected diodes 68 and 69, with the junction 105 therebetween being grounded, and then to an input of the NOR device 59.

Terminal 131 may be used to reset the counter apparatus to ZERO by applying a ONE signal to the NOR elements 12, 36, 47 and 59. Terminal 129 may be used to reset the counter to fifteen by applying a ONE signal to NOR elements 14, 38, 48 and 57. Also any number, within the range of the counter may be preset into the counter apparatus through an input of the NOR elements 14, 38, 48 and 57.

For the up or forward counting (1, 2, 3, etc.) operation of the pulse counter apparatus shown in FIG. 1, a positive ONE is supplied from the terminal 129 of the switching device 32 to the conductor 29; a ZERO is supplied from the terminal 131 of the switching device 32 to the conductor 31; and a negative ONE, in the binary coded decimal system, or a ZERO, in the binary system, is supplied from terminal 156 of the switching device 32 to the circuit junction 56 between the diodes 52 and 54.

Figure 2:
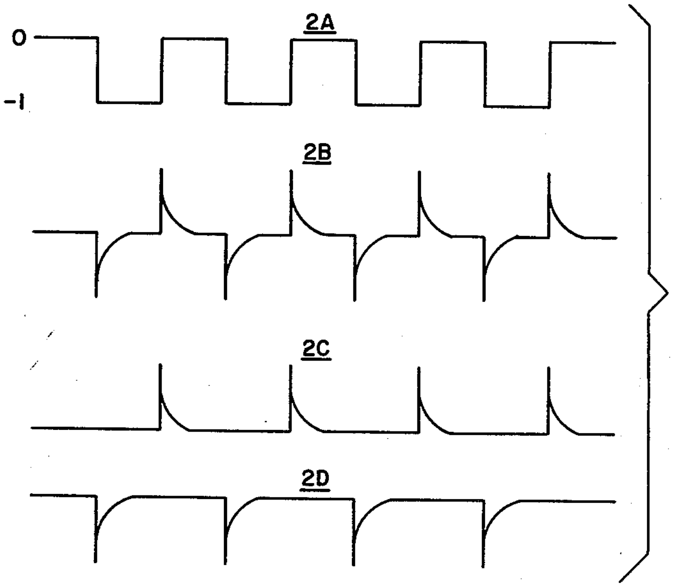
FIG. 2 is a curve chart illustrating the operation of the provided diode circuitry in accordance with the present invention.

Referring to FIG. 2, there is shown a curve chart illustrating the operation of the biased diode circuitry, for example, the diodes 28 and 30 as biased by the conductors 29 and 31. In curve 2A there are shown the typical output signals from the NOR device 22. In curve 2B there are shown the resulting signals which would appear at circuit junction 26 if each of the diodes 28 and 30 was not connected to the circuit junction 26. In curve 2C there are shown the resulting signals that actually do appear at circuit junction 26 for the forward or count up operation when the conductor 31 has applied to it a ZERO and the conductor 29 has applied to it a positive ONE. In curve 2D there are shown the resulting signals that appear at circuit junction 26 for the reverse or count down (9, 8, 7, etc.) operation, as explained below. The bistable circuit 40 will change its state of operation on either the positive spikes of curve 2C or the negative spikes of curve 2D. Thus, the NOR device 22 supplies a pulse ONE signal to the inputs of the NOR devices 36 and 38, whenever the output of the NOR device 14 changes from a ONE signal to a ZERO signal.

Figure 3:
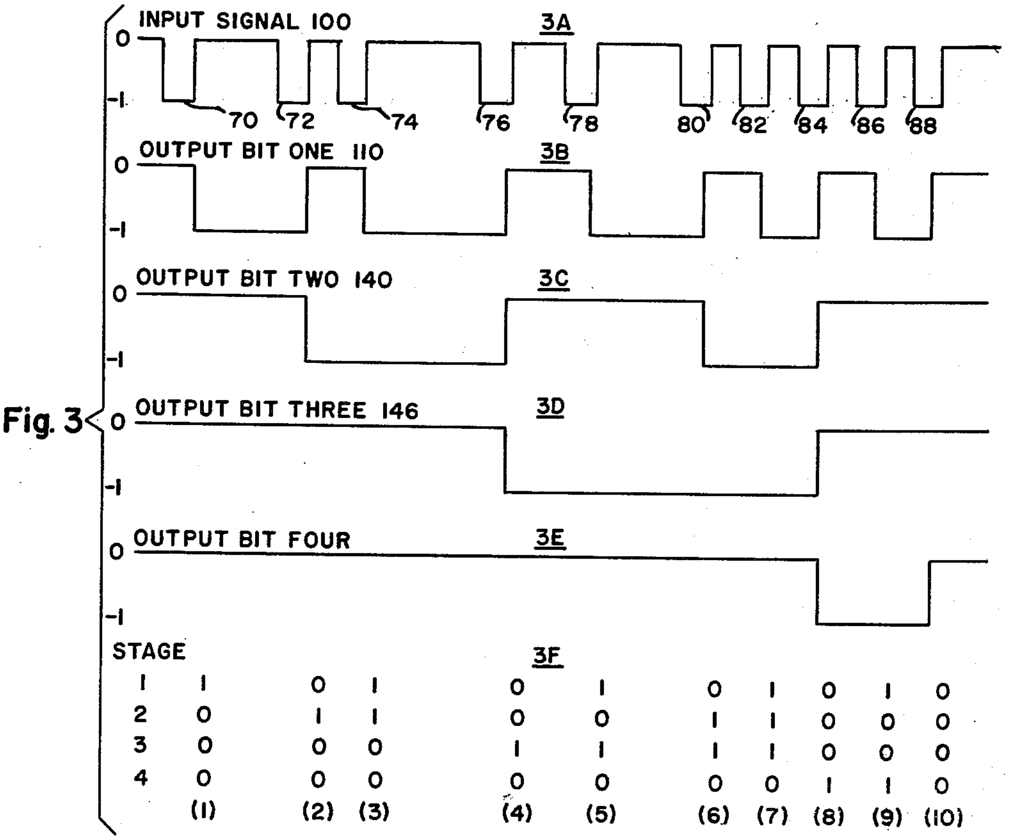
FIG. 3 is a curve chart illustrating the forward counting operation of the present pulse counting apparatus.

In FIG. 3, there is provided a curve chart illustrating the operation of the reversible pulse counting apparatus, as shown in FIG. 1, in the up or forward direction. The input signal pulses applied to terminal 100 are shown by curve 3A. The first input pulse 70 supplied to the terminal 100 and to the bistable circuit 10 shown in FIG. 1 causes the bistable circuit 10 to change its operative state such that a ONE output signal is supplied by the NOR device 12, as shown by curve 3B and so a 0 is supplied by NOR device 14, to the first stage output terminal 101. This causes the NOR device 22 to supply a ONE output signal, such that the bistable circuit 40 of the second stage 2 does not change its state of operation and also stages 3 and 4 do not change states, as shown by curve 3C. The second input pulse 72 supplied to the terminal 100 causes the bistable circuit 10 to change its operative state such that the NOR device 12 provides a ZERO ouput signal and this allows the NOR device 22 to provide an output signal which is applied to one input of each of the NOR devices 36 and 38, because the diodes 30 and 28 are biased for forward or up count.

As shown in curve 3C, the signal from the NOR device 22 to the bistable circuit 40 changes its output signal such that the NOR device 36 provides a ONE output signal to indicate the total count level of two presently in the pulse counting apparatus as shown in FIG. 1.

The next or third input pulse 74 causes the NOR device 12 of the bistable stage 10 to now provide a ONE output signal. The NOR device 36 of the bistable circuit 40 continues to provide a ONE signal as shown by curve 3C, and the NOR device 47 and 59 of the bistable circuits 46 and 49 continue to provide a ZERO signal as shown by curves 3D and 3E. When the fourth input pulse 76 is supplied to the terminal 100, this causes the NOR device 12 of the bistable stage 10 to supply a ZERO output signal as shown by curve 3B, which in turn causes the NOR device 36 of the bistable stage 40 to change to a ZERO output signal as shown in curve 3C, and this in turn causes the NOR device 47 of the bistable stage 46 as shown in curve 3D to now provide a ONE value output signal, while bistable stage 49 continues to supply a ZERO signal at terminal 149.

The counter apparatus operates in a straightforward manner on receiving the input pulses 78, 80, 82. The output signals for the respective stages are shown in chart 3F.

If counting in the binary number system is desired, a ONE signal is applied to input terminal 5 of the feedback NOR device 50, and a ZERO signal is applied to terminal 56, between diodes 52 and 54, from terminal 156 of the switching device 32. Thus, in a binary system with four stages, the counter would go to the number 15 (a ONE signal in each stage) and on the next input pulse the counter would reset to have a ZERO signal in each of the counting stages.

In the binary coded decimal number system, the ONE signal is removed from terminal 5 of the NOR device 50, and for forward count operation, a ONE is applied to junction 56, and for reverse count a ZERO is applied to junction 56. When the number 9 is present in the counter and the next incoming pulse is received, the counter resets (all stages go to a ZERO signal output); thus allowing the counter to operate in multiples of ten.

Considering the present example for the count up case, in the binary coded decimal system, when the eighth pulse 84 is received at terminal 100, the bistable circuits 10, 40 and 46 are changed from ONE to ZERO signal outputs at terminals 110, 140 and 146, respectively. NOR device 48 then supplies a ONE signal to NOR device 51, which in turn provides an output signal to set the NOR device 59 to a ONE. So the NOR device 57 provides a ZERO output signal to the NOR device 50, which in turn supplies a ONE signal, through the resistor 66, to the NOR device 22; thus blocking the following stages of the counter. The ninth pulse 86 sets stage 1 of the counter to a ONE, while stages 2 and 3 remain at a ZERO, and stage 4 remains at a ONE, as the NOR device 22 has a ONE signal applied to its input from the NOR device 50. When the tenth pulse 88 is received, stages 1 and 4 must reset to a ZERO, while stages 2 and 3 must remain at ZERO. The pulse 88 applied to terminal 100 causes the bistable circuit 10 to change states so that the NOR device 12 now provides a ZERO signal and the NOR device 14 provides a ONE signal. The ONE signal from the NOR element 14 is coupled through the capacitor 65 to the NOR device 59 which causes it to provide a ZERO output signal. The NOR device 57 provides a ONE output signal that is fed back to the NOR device 50, causing it to provide a ZERO output signal. The diode 69 provides a short to ground 105 for the positive spike from capacitor 65 when the output signal from the NOR device 14 changes from a ZERO to a ONE. The diodes 165 and 54 block the negative spike from the capacitor 65, which is applied to the NOR device 59 to reset it to have a ZERO output signal. Now the stages 1, 2, 3 and 4 are reset to have a ZERO output signal and ready to count another decade.

Figure 4:
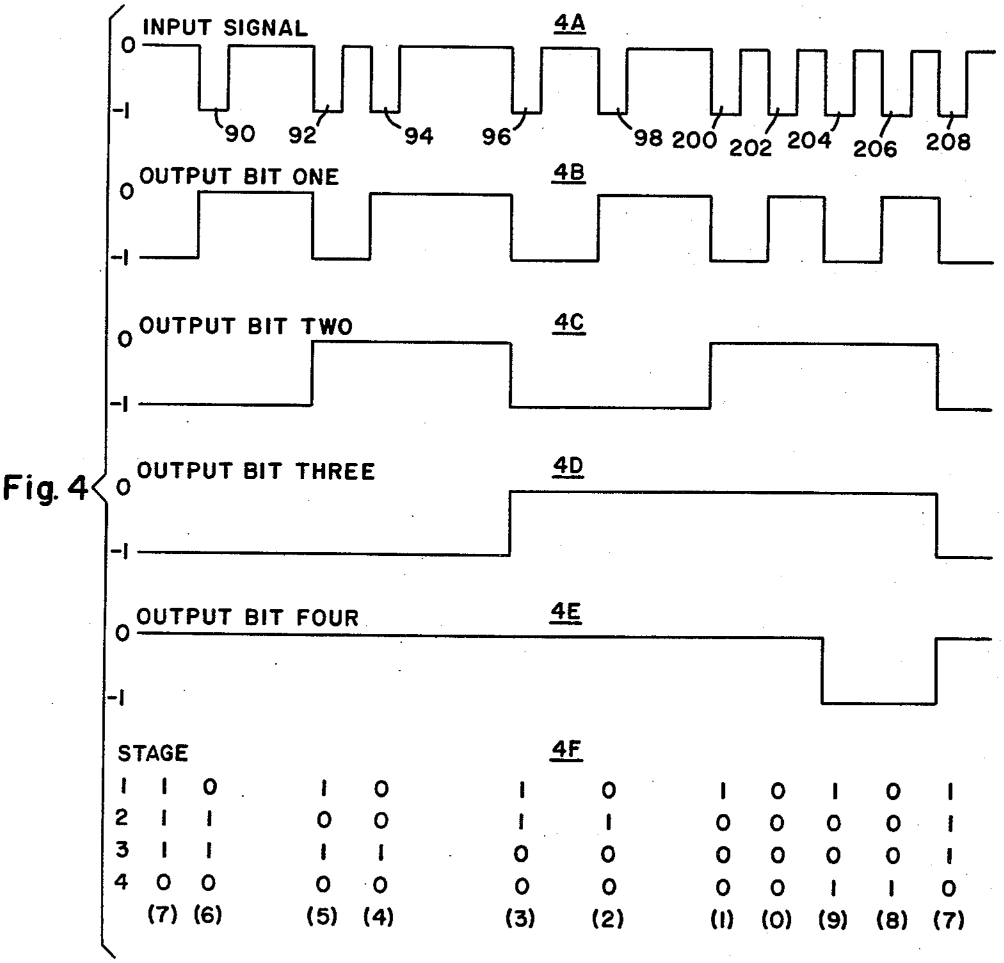
FIG. 4 is a curve chart illustrating the reverse countinfi operation of the present pulse counting apparatus.

The reverse counting operation (2, 1, 0, 9, 8, etc.) of the pulse counter apparatus as shown in FIG. 1 is illustrated by the curve charts shown in FIG. 4. In this regard, it should be noted: a ZERO is supplied from terminal 129 of the switching device 32 to the conductor 29; a negative ONE is supplied from the terminal 131 of the switching device 32 to the conductor 31; and a ZERO is supplied from the terminal 156 of the switching device 32 to the junction point 56. This results in a negative pulse being supplied to the succeeding bistable stages whenever a preceding bistable stage changes from a ZERO output to a ONE output. The biasing of the diodes operative with the respective bistable stages in this regard is such that positive pulses are shorted out by the diodes 21, 28, 39 and 41 as shown for the bistable circuits 10, 40, 46 and 49, respectively.

More specifically, curve 4A of FIG. 4 illustrates the input signals, as arbitrarily chosen for purpose of illustration only, which might be applied to the terminal 100 shown in FIG. 1. Assume that the pulse counting apparatus initially contains the number 7, or a ONE signal in stages 1, 2 and 3, and a ZERO in stage 4, as shown in chart 4F. A first input pulse 90 shown in curve 4A results in the first stage bistable circuit 10 changing its state of operation such that a ZERO output signal is supplied by the NOR device 12. It should be noted that, as shown in curve 4C, the ONE output signal is still supplied by the second stage bistable circuit 40, and, as shown in curve 4D, the ONE output signal is still provided by the third stage bistable circuit 46, and the ZERO output signal, as shown in curve 4F, is still supplied by the fourth stage bistable circuit 49.

The second input pulse 92 applied to the input terminal 100 causes the first stage bistable circuit 10 to change its state of operation such that the NOR device 12 now provides a ONE output signal. The NOR device 36 of the bistable stages 40 changes to provide a ZERO signal and the NOR device 47 continues to provide a ONE output signal. The third input pulse 94 applied to the input terminal 100 causes the NOR device 12 of the bistable stage 10 to now supply a ZERO output signal, which does not change the output signal of the bistable stage 40, as shown by curve 4B. The fourth input pulse 96 supplied to the input terminal 100 causes the NOR device 12 to change such that a ONE output signal is now supplied; the NOR device 36 now provides a ONE signal as shown by curve 4C, and the NOR device 47 now provides a ZERO signal as shown by curve 4D. The fifth input pulse 98 supplied to the terminal 100 causes the NOR device 12 of the first bistable stage 10 to change its state of operation such that it now supplies a ZERO output signal; this, in turn, does not change the state of operation of the NOR device 36 of the second bistable stage 40, and the NOR device 47 of the third bistable stage 46 continues to supply a ZERO output signal as shown by curve 4D, while NOR element 59 continues to supply a ZERO output signal as shown by curve 4E. It can be seen that in effect a subtraction operation is provided for each input pulse supplied to the terminal 100, as illustrated by the curves 4B, 4C, 4D and 4E relative to the outputs of the respective bistable stages. Input pulses 200 and 202 set the counter to the one (1) digit and zero (0) digit level, respectively, as shown in chart 4F.

If pure binary counting is desired in the count down operation, a ONE signal is applied to terminal 5 of the NOR element 50. Thus, when pulse 204 is applied to terminal 100, the counter must reset to have ONE signals in each of the counting stages, that is, the digit fifteen (15), which is the largest number for a four-stage counter.

In the binary coded decimal number system, no input signal is applied to terminal 5. When the pulse 204 is supplied to terminal 100, it is necessary that stages 1 and 4 change to have ONE output signals, while the stages 2 and 3 must remain at a ZERO output level, which is indicative of the nine (9) digit, as shown in chart 4F. To accomplish the count down operation (3, 2, 1, 0, 9, 8, etc.) in the binary coded decimal system, when the pulse 204 is applied to terminal 100, the counter is set to the digit fifteen (15) in a purely binary manner, with a ONE signal output from each of the stages 1, 2, 3, and 4. The changing states of the bistable circuit 49 causes the NOR element 57 to supply a ZERO signal to the NOR device 50, which then supplies a ONE signal through the capacitor 67 to the NOR device 36, to reset it to have a ZERO output signal, and to the NOR device 47, to reset it to have a ZERO output signal. The diode 68 provides a short to the ground 105 for positive spikes from the capacitor 66 when the NOR device 50 changes its output signal from a ZERO to a ONE during the down counting operation. The diode 167 blocks the negative spike from the capacitor 67 so that it may be applied to the NOR devices 36 and 47 so that they may be reset to have ZERO output signals. The diode 52 provides a short to ground 105 for the ONE signal from the NOR device 50. Thus, bistable circuits 40 and 46 are in their ZERO output signal states; while bistable circuits 10 and 49 are in their ONE output signal states, which are the proper states to be indicative of the digit nine (9), as shown in chart 4F.

In general, it should be noted that the NOR device 22 provided in the output of the first bistable stage 10 is included because of the input-output characteristics of the bistable circuits, such that a ONE signal from a preceding stage is operative to change the operative state of the succeeding stage. If one bistable circuit 10 is used to drive another bistable stage, such as the bistable circuit 40 directly, then no other NOR devices may be driven from the same output side of the preceding bistable stage that is driving the next succeeding stage. The circuit arrangement as shown in FIG. 1 provides a greater flexibility in this regard, in that the outputs of the respective bistable stages may be desired for driving additional NOR devices. Also, suitable indicating lights or other count level responsive devices may be desired, whereby the output signals from the bistable circuits 10, 40, 46 and 49 may be indicated through the terminals 110, 140, 146 and 149, respectively, if desired.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

I claim as my invention:

1. In pulse counting apparatus operative with input signals having a leading and a trailing edge, the combination of a plurality of bistable counting stages, with each of said counting stages being provided for a different binary digit of a number of input pulses to be counted and including input and output terminals and having at least two states of operation wherein ZERO and ONE output signals are respectively provided at said output terminal, a plurality of gating circuits connected respectively between the output terminal of each counting stage and the input terminal of the next adjacent counting stage such that said input pulses are successively counted by said plurality of counting stages, control means operatively connected between each of said counting stages and said gating circuits, said control means being operative to provide spike signals of different polarities in response to the leading and trailing edges respectively of the output signals from the preceding gating element, and a bias voltage source operative to provide a first control signal for providing a first predetermined counting operation in response to spike pulses of one polarity being sensed and having a second control signal for providing a second predetermined counting operation when spike pulses of another polarity are being sensed.

2. In reversible pulse counting apparatus operative with input signals having a leading and a trailing edge, the combination of a plurality of bistable counting devices, with each of said counting devices including input and output terminals and having at least two states of operation wherein ZERO and ONE output signals are respectively provided at said output terminal, a plurality of gating circuits connected respectively between the output terminal of each of said counting devices that precedes another counting device and the input terminal of the next successive counting device such that applied input pulses are counted by said plurality of counting devices, control means operatively connected between each of said counting stages and said gating circuits, said control means being operative to provide spike signals of different polarities in response to the leading and trailing edges respectively of the output signals from the preceding gating element, and a bias voltage source operative to provide a first control signal for providing a first predetermined counting operation in response to spike pulses of one polarity being sensed and having a second control signal for providing a second predetermined counting operation when spike pulses of another polarity are being sensed.

3. In reversible pulse counting apparatus operative with at least one input pulse having a leading edge and a trailing edge, the combination of a plurality of bistable counting devices, with each of said counting devices including input and output terminals and having at least two states of operation wherein ZERO and ONE output binary signals are respectively provided at said output terminal, a plurality of gating circuits connected respectively between the output terminal of each preceding counting device and the input terminal of the next succeeding counting device such that applied input pulses are counted by said plurality of counting devices, and a bias voltage source operative with said gating circuits and having a first control signal for providing a first predetermined counting operation wherein the leading edge of said input is sensed and having a second control signal for providing a second predetermined counting operation wherein the trailing edge of said input pulse is sensed.

4. In reversible pulse counting apparatus operative in a predetermined number system with input pulses having leading and trailing edges, the combination of a plurality of NOR bistable counting devices, with each of said counting devices including input and output terminals and having at least two states of operation wherein ZERO and ONE output signals are respectively provided at said output terminal, a plurality of NOR gating circuits connected respectively between the output terminal of each of said counting devices that precedes another counting device and the input terminal of the next successive counting device such that applied input pulses are counted by said plurality of counting devices, control means operatively connected between each of said counting stages and said gating circuits, said control means being operative to provide spike signals of different polarities in response to the leading and trailing edges respectively of the output signals from the preceding gating elements, a bias voltage source operative to supply a first control signal for providing a first predetermined counting operation in response to spike signals of one polarity being sensed and a second control signal for providing a second predetermined counting operation when spike signals of another polarity are being sensed, and feedback control means operative with at least one of said counting devices and said gating circuits to control the operation of said apparatus to be operative to count in the predetermined number system.

References Cited by the Examiner

UNITED STATES PATENTS 2,841,705 7/58 Moerman -------------- 328—45

OTHER REFERENCES

Control Engineering, "The Transistor Nor Circuit" by Mathias, May 1959, Fig. 14; pages 82, 83, 84.

ARTHUR GAUSS, *Primary Examiner.*

JOHN W. HUCKERT, *Examiner.*